3,770,706
SURFACE SULFONATION-EPOXIDATION OF ORGANIC POLYMERS

Wilhelm E. Walles, Midland, Mich., assignor to The Dow Chemical Company, Midland, Mich.
No Drawing. Filed Sept. 13, 1971, Ser. No. 180,229
Int. Cl. B32b 27/16; B44d 5/12
U.S. Cl. 260—79.3 R
8 Claims

ABSTRACT OF THE DISCLOSURE

Organic polymers such as polyethylene, polystyrene and polypropylene are rendered adhesive, antistatic and highly impermeable to oleophilic materials and low molecular weight gases such as oxygen and carbon dioxide by initially surface sulfonating the organic polymer and subsequently reacting the substituent sulfonic acid groups with alkylene oxide or similar epoxide to form the corresponding ester of sulfonic acid.

BACKGROUND OF THE INVENTION

This invention relates to adhesive, antistatic articles of organic polymers which are impermeable to oleophilic materials and low molecular weight gases and to a method for the production thereof.

The use of organic polymers in the fabrication of shaped articles such as filaments, fibers, films, sheets, enclosure members such as bottles, tanks and other containers, and other molded articles is well known. Unfortunately articles of most organic polymers are non-electroconductive, are non-adherent to polar materials such as inks, paints, dyes and various polar adhesives such as epoxy resins and the like, and are readily permeated by oleophilic material such as liquid and gaseous hydrocarbons and chlorinated hydrocarbons and by gases such as oxygen and carbon dioxide. As a result of the foregoing deficiencies, many organic polymers are entirely excluded from many applications or such polymers must be treated with various agents which tend to impart varying degrees of electroconductivity, adhesion and impermeability to oleophilic materials and the like. Of the prior art techniques for imparting one or more of the foregoing properties to such organic polymers, surface sulfonation offers many advantages from standpoint of economy and versatility, although other surface treatment techniques are suitable for somewhat more limited purposes.

As exemplary prior art surface sulfonation techniques, U.S. 2,400,720 discloses surface sulfonation of polymers such as polystyrene, phenolic, coumarone and indene resins in order to render the surfaces thereof dyeable, hydrophilic, antistatic and the like. U.S. 2,937,066 teaches that polyethylene can be surface sulfonated to render it dyeable and antistatic. U.S. 3,578,484 discloses that plastic articles which are previously surface sulfonated can be electrostatically spray painted to provide articles wherein the paint adheres well to the sulfonated surface. Belgium Pat. 740,763 discloses that enclosure members of non-aromatic polymers can be surface sulfonated and subsequently treated with base to improve impermeability of such enclosure members to oleophilic materials such as gasoline. It is found, however, that in practice of many of the prior art sulfonation techniques, the surface sulfonated article exhibits sensitivity to water and other hydrophiles such that contact of the article therewith often causes delamination of the sulfonated surface from the remaining portion of the article and/or causes swelling of the sulfonated surface. Under such conditions, it is found that in many instances adhesion between the sulfonated surface and any applied coating, whether it be dye, ink, paint, metal or otherwise, is significantly reduced. In addition, it is often found that the sulfonated polymers wherein the sulfur trioxide groups exist in the form of the sulfonic acid or neutralized sulfonate groups act as ion exchange resins. Ion exchange is undesirable in many instances.

Therefore it would be highly desirable to provide a method for treating organic polymers which suitably imparts antistatic properties, adhesion and impermeability, but which does not appreciably increase water sensitivity.

SUMMARY OF THE INVENTION

The present invention provides antistatic, adhesive, impermeable organic polymers having low sensitivity to water by initially surface sulfonating the organic polymer and subsequently reacting the substituent sulfonic acid groups of the organic polymer with an epoxide to form corresponding esterified sulfonic acid groups.

In another aspect the present invention is a normally solid organic polymer composition comprising an organic polymer and a plurality of esterified sulfonic acid groups chemically bonded to molecules of said polymer such that the surface of said polymer composition contains about 0.001 to about 50 milligrams of sulfur trioxide equivalents per square centimeter.

The surface sulfonated-epoxidized organic polymers of the present invention exhibit improved antistatic properties, adhesion to a wide variety of polar materials such as dyes, paints, inks and adhesives, receptivity to metal coatings and impermeability to oleophilic materials and low molecular weight gases such as oxygen and carbon dioxide.

Surface sulfonated-epoxidized articles of the organic polymers are useful as substrates for painting, and metal coating and are useful as enclosure members for containing oleophilic materials and for excluding gases such as oxygen and carbon dioxide. Exemplary uses include containers, such as gasoline and other fuel tanks, fuel barrels and drums, oleaginous food containers such as bags, tubs and cartons; fibrous materials for use in carpets, clothing and other fabric; plastic substrates in metal clad plastics such as capacitors, auto parts, etc.; plastic substrates for use in electrostatic spray painting, foamed plastics, plastic lined pipe and the like.

DESCRIPTION OF THE PREFERRED EMBODIMENTS

For the practice of the preferred embodiments of this invention, the term "organic polymer" is meant to include any sulfonatable, solid or foamed, plastic or resin. Sulfonatable plastics or resins have hydrogen atoms bonded to the carbon atoms which are replaceable by sulfonic acid groups. Thus polytetrafluoroethylene can not be used as the organic polymer in the practice of this invention since it does not have any replaceable hydrogen atoms and therefore is not sulfonatable.

Exemplary suitable organic polymers are thermo-setting plastics such as epoxy resins, phenol-formaldehyde resins, urea-formaldehyde resins, silicones, polyurethanes, and the like. Suitable organic polymers are also the thermoplastite polymers including the addition-type homopolymers, copolymers and blends thereof prepared from the aliphatic α-monoolefins, aliphatic conjugated and non-conjugated dienes, trienes and polyenes, halogenated aliphatic olefins, α,β-ethylenically unsaturated carboxylic acids, vinyl esters of non-polymerizable carboxylic acids, alkyl esters of α,β-ethylenically unsaturated carboxylic acids, monovinylidene aromatic monomers, α,β-ethylenically unsaturated nitriles and amides, ethylenically unsaturated ethers and ketones and other ethylenically unsaturated monomers which polymerize across the ethylenic groups to form polymers having linear carbon-to-carbon backbone molecular structure with a plurality of free hydrogen atoms attached to the chain and/or attached to carbon atoms of the substituents of said chain. Also included as suitable organic polymers are the thermoplastic condensation-type polymers exemplified by the polyamides such as nylon, the polyimides, the polyesters such as polyethylene terephthalate, the polycarbonates, such as the polyesters of carbonic acid and alkylidenediphenols; the polyethers such as polyformaldehyde.

Organic polymers which are of special interest in the practice of this invention are the thermoplastic addition-type homopolymers, copolymers and mixtures of polymers of the following monomers:

(1) The aliphatic monoolefins having from 2 to 18 carbon atoms such as ethylene, propylene, butene-1, isobutylene and the like;

(2) Aliphatic conjugated dienes and trienes having from 4 to 20 carbon atoms such as butadiene, isoprene, heptatriene and the like;

(3) Halognated aliphatic olefins such as vinyl chloride, vinylidene chloride, vinyl bromide and the like;

(4) Vinyl esters of non-polymerizable carboxylic acids having from 2 to 16 carbon atoms such as vinyl acetate, vinyl propionate, vinyl butyrate, vinyl cyclohexane carboxylate, vinyl benzoate and the like;

(5) Alkyl esters of $\alpha,\beta$-ethylenically unsaturated carboxylic acids having alkyl moieties of 1 to 18 carbon atoms and acid moieties of 3 to 8 carbon atoms such as ethyl acrylate, methyl methacrylate, isobutyl acrylate, n-butyl acrylate, methyl acrylate, isopropyl acrylate, methyl acrylate, diethyl maleate, ethyl fumarate, octyl itaconate and the like;

(6) $\alpha,\beta$-Ethylenically unsaturated carboxylic acids having from 3 to 8 carbon atoms such as acrylic acid, methacrylic acid, ethacrylic acid, maleic acid and anhydride, itaconic acid, citraconic acid, aconitic acid, fumaric acid and the like.

(7) $\alpha,\beta$-Ethylenically unsaturated nitriles and amides having 3 to 8 carbon atoms usch as acrylonitrile, fumaronitrile, methacrylonitrile, acrylamide and methacrylamide;

(8) Ethylenically unsaturated ethers and ketones having from 3 to 14 carbon atoms such as vinyl methyl ether and methyl vinyl ketone; and (9) Monovinylidene aromatic monomers having 8 to 24 carbon atoms such as styrene, $\alpha$-methylstyrene, ar-t-butylstyrene, ar-chlorostyrene, ar-bromostyrene, ar,ar-dimethylstyrene, ar-cyanostyrene, ar-methoxystyrene and the like.

Other polymers of special interest are poly-(4-methylpentene-1) (so-called TPX-polymers), chlorinated polyethylene and chlorinated polypropylene, rubber hydrochloride, nylon, polyethylene terephthalate, and the polyimides.

Prior to the practice of the treatment process of the present invention, it is desirable to fabricate the organic polymer in conventional manner into the form of the desired article. Before or during such fabrication, the organic polymers can be mixed with conventional additives for the polymer such as antioxidants, fillers, pigments, dyes, extenders, plasticizers and the like without impairing the subsequent sulfonation and epoxidation steps since both of the latter are surface treatments.

In accordance with the practice of the invention, the organic polymer is surface sulfonated to a degree of sulfonation in the range of from about 0.001 to about 50 milligrams of sulfur trioxide equivalents in the form of sulfonic acid groups per square centimeter of surface, preferably from about 0.06 to about 10 milligrams. While it is found that about 0.001 milligram of sulfur trioxide equivalents provides the surface of the organic polymer with antistatic properties and satisfactory adhesion, it is found that at least about 0.015 milligram of sulfur trioxide equivalent per square centimeter, preferably at least about 0.06 milligram per square centimeter, is required to provide desirable impermeability to oleophilic materials. Even higher degrees of sulfonation, e.g., about 1 milligram, are required to impart desirable impermeability to halogenated lower hydrocarbons such as methylene chloride.

The organic polymer is suitably surface sulfonated in the practice of this invention by a vapor phase process using gaseous sulfur trioxide, chlorosulfonic acid or fluosulfonic acid in an inert gas; by a liquid phase sulfonation process using dilute sulfur trioxide in an inert chlorinated solvent; concentrated sulfuric acid; or oleum. These techniques are well known in the art as is shown by U.S. Pats. 2,945,842 to Eichhorn et al., 2,937,066 to Walles, and 2,854,477 to Steinhauer. In general the vapor phase sulfonation technique is preferred since there is no visible attack of the plastic surface as shown for some aromatic plastics in the method wherein inert solvents are used, and gaseous sulfur trioxide is preferred over the halosulfonic acids because the use of these acids produces hydrochloric acid or hydrofluoric acid as by-products. Likewise, the vapor phase technique eliminates the need for solvents and solvent recovery; for example, no water washing is needed as with concentrated sulfuric acid.

A preferred method of sulfonating the organic polymer is to expose the desired article thereof to gaseous sulfur trioxide preferably diluted with a dry inert gas such as air, nitrogen, helium, carbon dioxide, sulfur dioxide and the like. The concentration of sulfur trioxide in the gaseous sulfonating agent can vary from about 0.1 to 100 volume percent based on total gaseous sulfonating agent, preferably from about 15 to about 25 volume percent of sulfur trioxide. The foregoing volume concentrations correspond to about 0.003 to about 3 grams of sulfur trioxide per liter (at atmospheric pressure) for the range of 0.1 to 100 volume percent and about 0.45 to about 0.75 gram of sulfur trioxide per liter for the range of 15 to 25 volume percent. The time of sulfonation required to produce acceptable degree of sulfonation varies with the organic polymer being surface sulfonated, the concentration of sulfur trioxide and the temperature. For example, at room temperature (25° C.), 10 volume percent sulfur trioxide requires about 20 minutes to sulfonate polyethylene to a degree of 5.7 milligrams $SO_3/cm.^2$, about 10 minutes to provide a degree of 3.62 milligrams $SO_3/cm.^2$ and about 2 minutes to provide a degree of 0.676 milligram $SO_3/cm.^2$. A gas phase containing 18 volume percent sulfur trioxide requires slightly more than one half the time required by 10 volume percent sulfur trioxide to provide the same degree of sulfonation. At temperature of 35° C., the time required when using 18 volume percent sulfur trioxide is shortened to 1–2 minutes. As evidenced by the foregoing, the time and concentration of sulfur trioxide are inversely related, thus any combination of the above variables may be used to suit specific needs. If polystyrene is to be sulfonated with 2 volume percent sulfur trioxide at 25° C. to provide the same degree of sulfonation, a similar contact time is required. It is important to exclude water vapor from the above gases by a conventional drier tube since, in the presence of water in a liquid or vapor form, the sulfur trioxide is converted to droplets of sulfuric acid of a varying concentration and the sulfonation of the polymer is either inhibited or prevented.

Another method of sulfonating the organic polymer is to use a 10% by weight solution of $SO_3$ in an inert liquid solvent, such as a liquid polychlorinated aliphatic hydrocarbons coming within the purview of this invention are methylene chloride, carbon tetrachloride, perchloroethylene, symtetrachloroethane and ethylene dichloride. However, other concentrations may be used, for example, from about 1% to about 25% by weight $SO_3$ in an inert solvent. It has been found that 8 minutes contact of polyethylene with 1% $SO_3$ in methylene chloride yields a dark brown polymer substrate which is a substantial vapor barrier to organic solvents and vapors. In addition, it has been found that as much as 30 minutes contact with a 9% by weight solution of $SO_3$ in methylene chloride also provides a suitable degree of sulfonation. The latter sulfonation reagent sulfonates polyethylene to a very black color whereas the color of crosslinked polystyrene is not significantly changed when exposed to the same conditions. It is, of course, to be understood that the time and concentration are inversely related and that any range within these two extremes may be used. Thus, a more concentrated solution of $SO_3$ may be used for a shorter contact time or a less concentrated solution for a longer contact time.

Although temperature is not critical in practicing the foregoing methods of sulfonation, it is generally advantageous to carry out said methods at temperatures in the range of from about —20° to about 60° C., preferably from about 20° to 40° C.

The pressure at which the sulfonation is carried out can be atmospheric or super atmospheric. Because of the convenience, it is preferred to carry out the sulfonation at atmospheric pressure. However, the reaction can also be carried out at a pressure of 1 to 10 pounds per square inch gage (p.s.i.g.).

While the foregoing methods are preferable, this invention is not limited to enclosure members which are sulfonated by any particular technique. Therefore, any method of sulfonating plastic material which will give the hereinbefore specified degree of sulfonation is suitable for the purpose of this invention.

Following sulfonation, the surface sulfonated organic polymer article having a plurality of sulfonic acid groups chemically bonded to polymer molecules thereof is contacted with suitable epoxide under conditions such that esterification of from about 10 to 100 mole percent of total sulfonic acid groups in the surface or surfaces of the article is accomplished. On a molar basis, from one up to about 100 moles of epoxide can react with one mole of sulfonic acid.

The epoxidation is readily carried out and it is only necessary to contact the surface sulfonated article with the epoxide. It is observed that reaction of the sulfonated polymer and epoxide is most desirably effected when the sulfur trioxide equivalents exist as free sulfonic acid groups and proceeds poorly, if at all, if the sulfur trioxide and equivalents are in neutralized form. Therefore it is desirable to avoid contacting the sulfonated polymer with neutralizing agent prior to the reaction with epoxide. Although the temperature and pressure at which the epoxidation is carried out are not critical, it is desirable to employ temperatures in the range of from about 0° to about 60° C., or under reflux conditions, and pressures in the range of from about atmospheric to superatmospheric. Preferably the epoxidation is carried out in the gas phase by reacting the sulfonic acid groups of the organic polymer with gaseous epoxide, preferably under dry conditions. Concentration of epoxide in the gaseous phase is usually from about one to 100 mole percent. However, the epoxidation is also suitably carried out by immersing the surface sulfonated organic polymer article in a solution of epoxide in an organic solvent for the epoxide such as methylene chloride, ethylene dichloride, toluene, hexane, cleaning naphthas, etc., particularly when the epoxide is normally solid, and then refluxing the solution for a sufficient time to obtain completion of reaction, e.g., from about 1 to about 100 minutes. Concentration of epoxide in the liquid phase is usually from about 0.1 to about 100 weight percent.

In the practice of this invention, suitable epoxides are the organic epoxides having the formula:

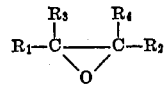

wherein $R_1$, $R_2$, $R_3$, and $R_4$ are substituents of the group consisting of hydrogen, hydrocarbon radicals and other radicals, including as non-limiting examples alkyl, aryl, alkaryl, aralkyl, cycloparaffinic, naphthyl, anthryl, phenanthryl, acenaphthenyl, naphthacyl, chrysyl, pyryl, benzohydryl, terphenylyl, methyl, ethyl, propyl, isopropyl, butyl, isobutyl, t-butyl, amyl, isoamyl, hexyl, isohexyl, heptyl, octyl, nonyl, decyl, undecyl, dodecyl, tridecyl, tetradecyl, pentadecyl, hexadecyl, heptadecyl, octadecyl, nonadecyl, and eicosyl, phenyl, tolyl, ethylphenyl, propylphenyl, cyclopentyl, cyclohexyl, benzyl, biphenyl, camphanyl, cinnamyl, cuminyl, cumpyl, cymyl, duryl, fenchanyl, phenethyl, phenpropyl, and phenbutyl, and including halosubstituted derivatives thereof as further illustrated by the following specific examples. The hydrocarbon substituent groups $R_1$, $R_2$, $R_3$ and $R_4$ may contain from 1 to 25 carbon atoms, and preferably 1 to 5 carbon atoms. Species of organic epoxides, which are oxirane compounds having the ring oxygen atom attached to two adjacent carbon atoms, include, ethylene oxide, propylene oxide, 1,2-butylene oxide, 2,3-butylene oxide, 1,2-pentene oxide, 2,3-pentene oxide, 1,2-hexene oxide, 2,3-hexene oxide, 3,4-hexane oxide, 1,2-heptene oxide, 2,3-heptene oxide, 3,4-heptene oxide, 1,2-octene oxide, 2,3-octene oxide, 3,4-octene oxide, 1,2-nonene oxide, 2,3-nonene oxide, 3,4-nonene oxide, 4,5-nonene oxide, 1,2-decene oxide, 2,3-decene oxide, 3,4-decene oxide, 1,2-dodecene oxide, phenyl ethylene oxide, 3-phenyl-1,2-propylene oxide, naphthyl ethylene oxide, 1-methyl-phenyl ethylene oxide, 3-cyclohexyl propylene oxide, 3-chloro-phenyl ethylene oxide, 3-phenethyl 1,2-butylene oxide, 4-tolyl 1,2-butylene oxide, 5-cuminyl 1,2-pentene oxide, 1,2-dibutyl ethylene oxide, 1,2-di-amyl ethylene oxide 1,2,3-trimethyl ethylene oxide, 1,2,3,4-tetramethyl ethylene oxide, α-epichlorohydrin and epibromohydrin.

Following expoxidation, the resulting esterified sulfonic acid groups exist in the form represented by the formula:

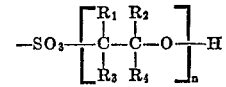

wherein $R_1$, $R_2$, $R_3$ and $R_4$ are described hereinbefore and $n$ is an integer from about 1 to about 20, preferably from 2 to about 8.

This surface sulfonated-epoxidized article is ready for use in the aforementioned applications.

The following examples are given to further illustrate a few embodiments of the invention and should not be construed as limiting its scope. In these examples, all parts and percentages are by weight unless otherwise indicated.

EXAMPLE 1

A film of polystyrene (molecular weight average =270,000) having the dimensions 4 x 25 cm. and 1.5 mils thick and a weight of 372 milligrams is placed in a vacuum and degassified.

An atmosphere of 2% by volume of sulfur trioxide ($SO_3$) gas diluted with dry carbon dioxide is introduced and allowed to react for 6 minutes.

After pulling a vacuum on the sample to remove excess $SO_3$ gas the film is weighed and is found to have increased 8.1 milligrams.

An atmosphere of ethylene oxide gas is then introduced and allowed to react for 160 minutes. After pulling a vacuum again and reweighing, it is found that the weight of the film increases 19.3 milligrams.

Repeating the procedure with an atmosphere of ammonia gas, does not result in a measurable increase in the weight of the film.

This shows that ethylene oxide has reacted with essentially all of the free sulfonic acid groups on the surface of the sulfonated polystyrene film. This result also shows that polymers treated in such manner do not act as ion exchange resins.

The treated film is then studied using infrared spectroscopy and is found to contain absorption bands characteristic of

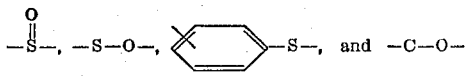

The molar ratio of ethylene oxide to sulfur trioxide bonded to the polystyrene film is determined to be $$\frac{19.3}{8.1} \times \frac{80}{44} = 4.3$$

Thus the molar ratio of ethylene oxide to sulfur trioxide is about 4.3:1.

The above data are consistent with the following structure:

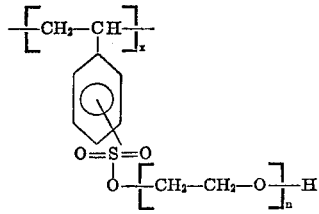

wherein $n$ is 4.3 indicating the average number of ethylene oxide groups per —$SO_3$ group.

EXAMPLE 2

A series of high density polyethylene films (1 mil) are immersed in a 2 weight percent solution of sulfur trioxide in methylene chloride for 4 minutes at 25° C. The films are then immersed in a 5 weight percent solution of the specified alkylene oxide in methylene chloride at 25° C. for 5 minutes. The films are removed and dried in a vacuum at 60° C. for 24 hours. The films are then tested for permeability to oxygen, nitrogen, carbon dioxide and methane and the results are recorded in Table I.

For purposes of comparison, an untreated polyethylene film is similarly tested for permeability and the results are recorded in Table I.

TABLE I

| Run No. | Treatment [1] | Permeability [2] | | | |
|---|---|---|---|---|---|
| | | $O_2$ | $N_2$ | $CO_2$ | $CH_4$ |
| 1 | $SO_3$ + EO | 173 | 42 | 711 | 92 |
| 2 | $SO_3$ + PO | 182 | 50 | 842 | 112 |
| 3 | $SO_3$ + BO | 165 | 38 | 744 | 101 |
| C [3] | none | 385 | 126 | 1,680 | 332 |

[1] EO=Ethylene oxide, PO=Propylene oxide, BO=1,2-Butylene oxide.
[2] Reported as cubic centimeters of gas permeating 100 square inches of film per day at 1 atmosphere and room temperature.
[3] Not an example of the invention.

EXAMPLE 3

A series of low density polyethylene bottles (450 cc.) having a wall thickness of 1 mm. are exposed to 15% volume percent sulfur trioxide in dry air for 3 minutes at 25° C. The bottles are water washed, dried and then filled with a 5 perecnt solution of specified alkylene oxide in methylene chloride. After 5 minutes at 25° C., the contents of the bottles are removed and the bottles are tested for degree of sulfonation and permeability to a commercial grade of regular gasoline. The results are recorded in Table II.

For the purposes of comparison, an untreated bottle is similarly tested for permeability to the gasoline. The results are also recorded in Table II.

TABLE II

| Run No. | Treatment [1] | Degree of sulfonation, mg. $SO_3/cm.^2$ | Gasoline loss rate, mg./day/bottle |
|---|---|---|---|
| 1 | $SO_3$ + EO | 0.028 | 140 |
| 2 | $SO_3$ + PO | 0.028 | 170 |
| 3 | $SO_3$ + BO | 0.028 | 160 |
| C [2] | None | None | 1,020 |

[1] Same as in Table I.
[2] Not an example of the invention.

EXAMPLE 4

For purposes of showing low moisture sensitivities of the polymers treated in the practice of the present invention, several polyethylene film samples are treated in accordance with the sulfonation and epoxidation procedures of Example 2. The treated films are then tested for moisture sensitivity and the results are recorded in Table III.

For purposes of comparison, a polyethylene film sulfonated by the foregoing procedure is similarly tested for moisture sensitivity and the results are recorded in Table III.

TABLE III

| Run No. | Treatment [1] | Moisture sensitivity [2], μg. $H_2O/cm.^3$ |
|---|---|---|
| 1 | $SO_3$ + EO | 245 |
| 2 | $SO_3$ + PO | 213 |
| 3 | $SO_3$ + BO | 259 |
| B [3] | $SO_3$ | 449 |

[1] Same as in Table I.
[2] Reported as micrograms of water absorbed per square centimeter of film. Determined from weight gain of about 150 square centimeters of film suspended from a quartz balance, first in dry nitrogen having 0% relative humidity and then in air having 98% relative humidity.
[3] Not an example of the invention.

EXAMPLE 5

A 200-g. portion of lightly cross-linked polystyrene beads (1 mm.) containing pentane as blowing agent is charged to a 10 liter flask rotating about a 45° axis. The rotating flask at room temperature is charged with 2 volume percent sulfur trioxide in dry carbon dioxide. After ten minutes, the sulfur trioxide-containing gas is removed and the flask is charged with ethylene oxide. After 15 minutes, the flask is purged with air and the polystyrene beads are washed with 2% ammonia in water.

The resulting treated beads are immersed in a dispersion of 0.1% crystal violet in water and are expanded in water heated to about 95° C. The resulting beads exhibit uniform color.

What is claimed is:

1. A normally solid, organic polymer composition comprising an organic polymer and a plurality of esterified sulfonic acid groups chemically bonded to molecules of said polymer such that the surface of said polymer composition contains from about 0.001 to about 50 milligrams of sulfur trioxide equivalents per square centimeter, said esterified sulfonic acid being the reaction product of a sulfonic acid group and an organic epoxide represented by the formula:

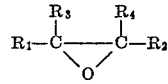

wherein $R_1$, $R_2$, $R_3$ and $R_4$ are substituents of the group consisting of hydrogen, hydrocarbon radicals and halosubstituted derivatives of hydrocarbon radicals wherein the hydrocarbon radical has from 1 to 25 carbon atoms.

2. The polymer composition according to claim 1 wherein the polymer is polyethylene.

3. The polymer composition according to claim 1 wherein the polymer is polystyrene.

4. The polymer composition according to claim 1 wherein the epoxide is an alkylene oxide having from 2 to 4 carbon atoms.

5. The organic polymer composition of claim 1 wherein said esterified sulfonic acid groups are represented by the formula

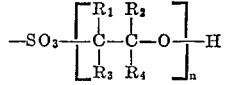

wherein $R_1$, $R_2$, $R_3$ and $R_4$ are individually hydrogen, hydrocarbon radicals and halosubstituted derivatives of hydrocarbon radicals wherein the hydrocarbon radical has from 1 to 25 carbon atoms and $n$ is an integer from 1 to 20.

6. A method for providing antistatic, adhesive organic polymers having low sensitivity to water comprising the steps of surface sulfonating the organic polymer to provide from about 0.001 to about 50 milligrams of sulfur trioxide equivalents per square centimeter in form of sulfonic acid groups chemically bonded to polymer molecules and subsequently reacting at least a portion of said sulfonic acid groups with an organic epoxide to form corresponding esterified sulfonic acid groups, said epoxide represented by the formula:

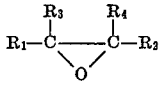

wherein $R_1$, $R_2$, $R_3$ and $R_4$ are substituents of the group consisting of hydrogen, hydrocarbon radicals and halo-substituted derivatives of hydrocarbon radicals wherein the hydrocarbon radical has from 1 to 25 carbon atoms.

7. The method according to claim 6 wherein said portion of said sulfonic acid groups reacted with epoxide constitutes from about 10 to 100 mole percent of said sulfonic acid groups.

8. The composition of claim 1 wherein the organic epoxide is selected from the group consisting of ethylene oxide, propylene oxide, 1,2 - butylene oxide, 2,3-butylene oxide, 1,2 - pentene oxide, 2,3 - pentene oxide, 1,2-hexane oxide, 2,3 - hexene oxide, 3,4 - hexane oxide, 1,2-heptene oxide, 2,3 - heptene oxide, 3,4 - heptene oxide, 1,2-octene oxide, 2,3 - octene oxide, 3,4 - octene oxide, 1,2-nonene oxide, 2,3 - nonene oxide, 3,4 - nonene oxide, 4,5-nonene oxide, 1,2 - decene oxide, 2,3 - decene oxide, 3,4-decene oxide, 1,2 - dodecene oxide, phenyl ethylene oxide, 3-phenyl - 1,2 - propylene oxide, naphthyl ethylene oxide, 1-methyl-phenyl ethylene oxide, 3-cyclohexyl propylene oxide, 3 - chloro-phenyl ethylene oxide, 3 - cyclohexyl propylene oxide, 3-phenethyl 1,2-butylene oxide, 4-tolyl 1,2 - butylene oxide, 5 - cuminyl 1,2 - pentene- oxide 1,2-dibutyl ethylene oxide, 1,2-di-amyl ethylene oxide, 1,2,3-trimethyl ethylene oxide, 1,2,3,4 - tetramethyl ethylene oxide, α-epichlorohydrin and epibromohydrin.

References Cited

UNITED STATES PATENTS

| | | | |
|---|---|---|---|
| 3,578,484 | 5/1971 | Walles et al. | 117—47 |
| 2,836,319 | 5/1958 | Pinsky et al. | 117—138.8 X |
| 3,613,957 | 10/1971 | Walles | 117—138.8 |
| 2,793,964 | 5/1957 | Gilbert et al. | 117—62.1 X |
| 2,400,720 | 5/1946 | Staudinger et al. | 117—138.8 |
| 2,727,831 | 12/1955 | Dixon et al. | 117—62.1 |
| 2,937,066 | 5/1960 | Walles | 8—53 X |
| 2,854,477 | 9/1958 | Steinhauer | 252—353 X |
| 2,832,699 | 4/1958 | Walles | 117—138.8 X |
| 2,945,842 | 7/1960 | Eichhorn et al. | 260—79 |
| 2,879,177 | 3/1959 | Nelson et al. | 117—138.8 X |

WILLIAM D. MARTIN, Primary Examiner

S. L. CHILDS, Assistant Examiner

U.S. Cl. X.R.

117—118, 138.8 B, 138.8 E, 138.8 UA